United States Patent Office 2,928,684
Patented Mar. 15, 1960

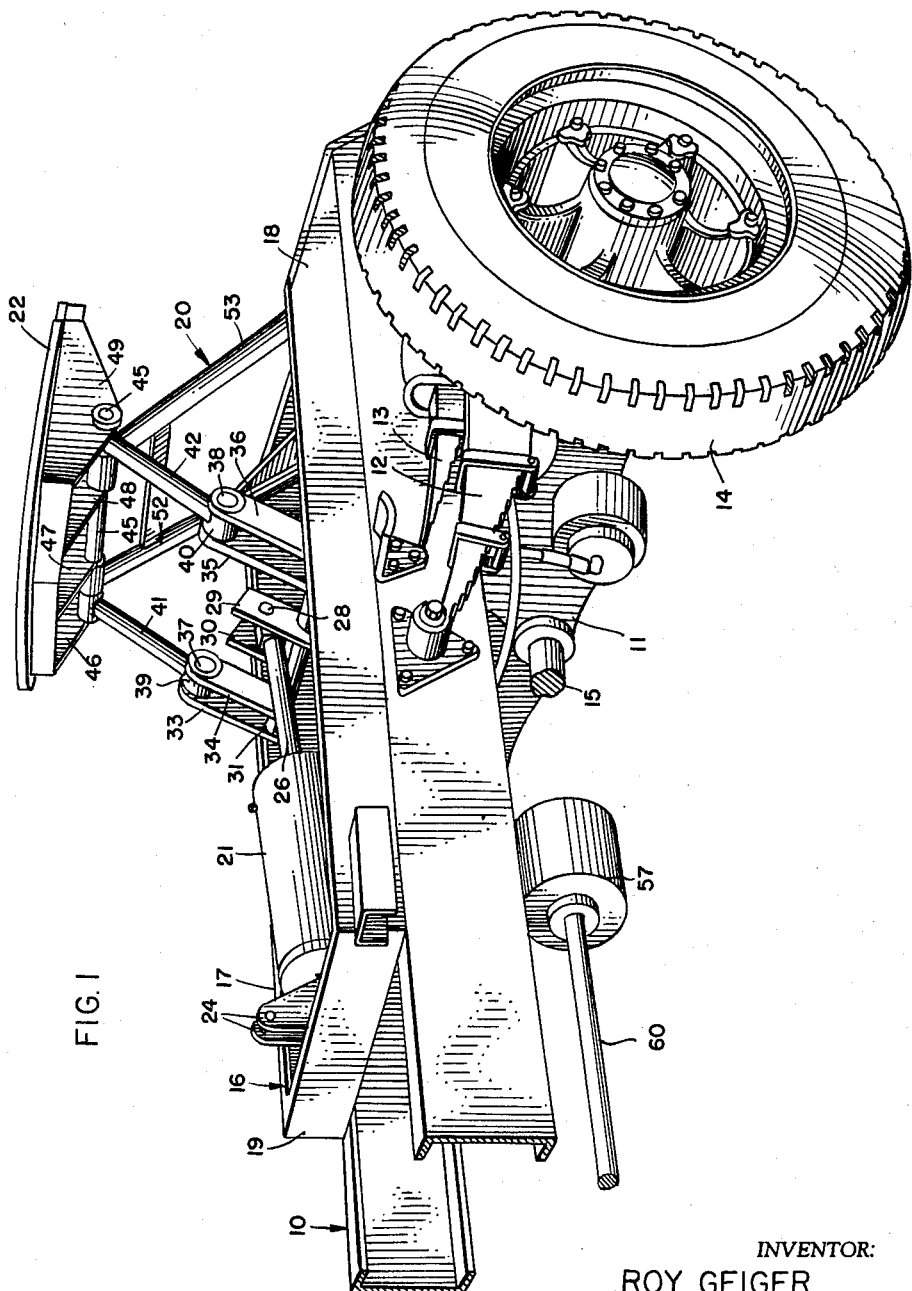

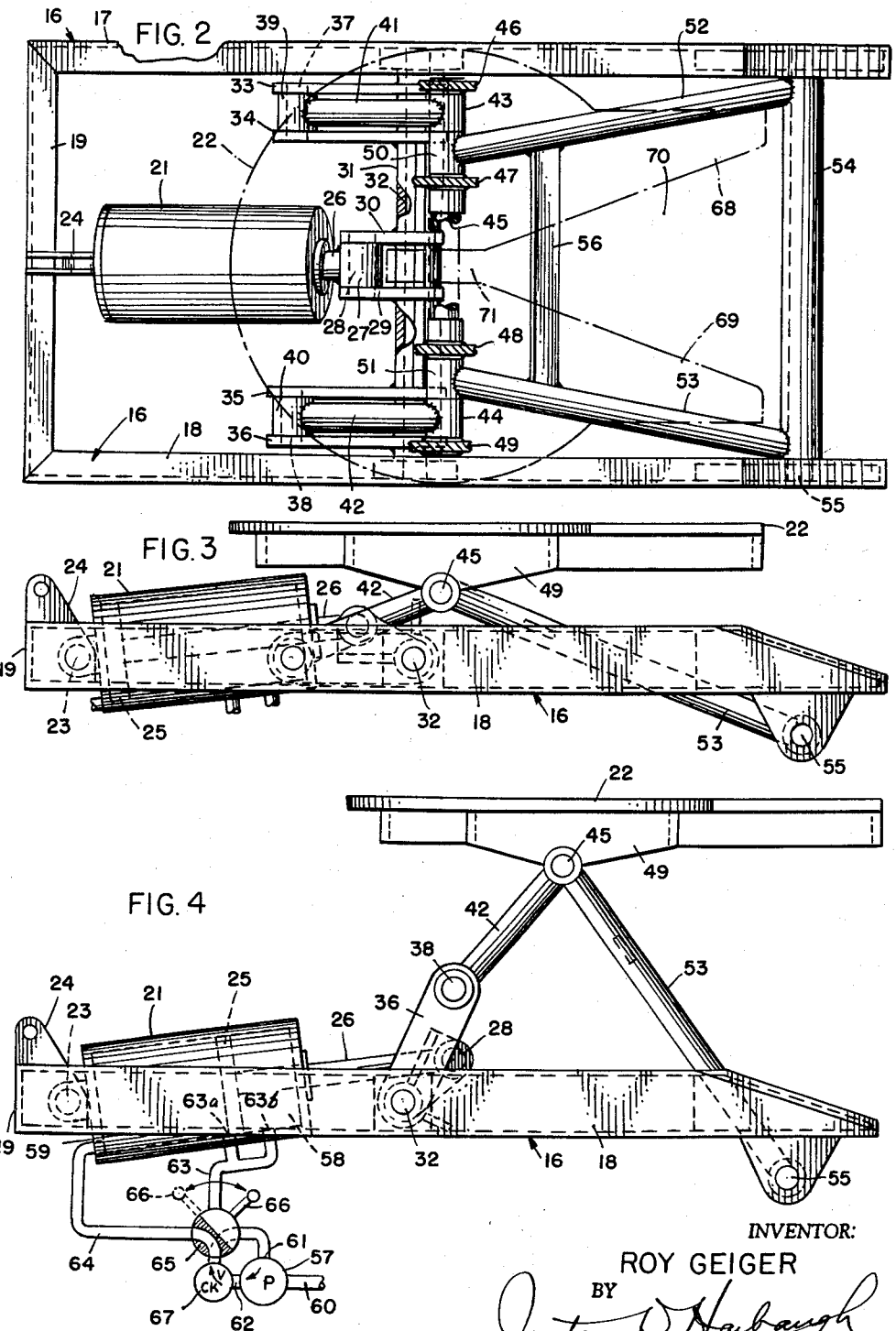

2,928,684

FIFTH WHEEL HOIST ASSEMBLY

Roy Geiger, Chicago Ridge, Ill.

Application December 13, 1957, Serial No. 702,623

6 Claims. (Cl. 280—425)

This invention relates to a fifth wheel assembly for the tractor of a tractor-trailer rig, and more particularly to a fifth wheel hoist especially useful with yard tractors employed in shifting trailers from place to place at a loading dock, positioning them on railroad flatcars, and for otherwise spot-locating trailers.

Since tractor-trailer rigs are in such common use today, it is well known that the tractors are releasably coupled to the trailers hauled thereby. The structural arrangement by which such releasable coupling is accomplished comprises a fifth wheel assembly carried by the tractor, and a kingpin assembly provided by the trailer at the forward end thereof. When the fifth wheel assembly is disposed beneath the forward end of a trailer, it supports the same thereon; and such supporting relation is maintained by the interlock of the kingpin and fifth wheel assemblies. However, the kingpin may be selectively released from its interlock with the fifth wheel to permit withdrawal of the tractor from beneath the trailer; and during such withdrawal, a retractible auxiliary wheel assembly provided adjacent the forward end of the trailer is lowered to support the same. Ordinarily, the top plate of the fifth wheel assembly is inclined downwardly and rearwardly to facilitate its movement into the coupled position thereof beneath the trailer.

The arrangement described permits tractors and trailers to be interconnected with facility; and as a result, and because one tractor may serve several trailers, it is often the practice to uncouple a trailer during the loading and unloading thereof to permit concurrent use of the tractor and driver therefor in another hauling operation. Further, railroad transportation of loaded trailers over long distances—a practice now in use—separates tractor and trailer for ordinarily the tractors are not shipped with the trailers.

These situations necessitate the availability of a yard tractor, at least at large loading docks and marshalling areas, for some means always must be on hand to shift the trailers to and from loading platforms, on and off the flatcars, etc. It is undesirable to use a wholly conventional tractor for such purposes for several reasons, and one of importance is that such tractors when coupled to a trailer do not elevate the auxiliary wheel supports thereof to a sufficient ground-clearance height, whereby the additional operations of elevating and lowering of these wheels are necessitated.

It is, accordingly, an object of this invention to provide an improved fifth wheel assembly particularly suitable for use with yard tractors, and characterized by enabling a trailer to be spot-located without retracting the auxiliary support wheels thereof. Another object of the invention is that of providing a fifth wheel assembly capable of sufficiently elevating the forward end of a trailer to substantially clear the auxiliary wheels thereof from the ground.

A further object is in the provision of a fifth wheel hoist assembly adapted for use with yard tractors and the like, and which is lowered for coupling and uncoupling thereof with a trailer, and raised during spot-location of the trailer so as to obviate retraction of the auxiliary wheels thereof. Still a further object is in the provision of a fifth wheel assembly of the character described, that is hydraulically actuated and is energized by a power take-off from the transmission of the tractor.

Yet another object is to provide a hydraulically actuated fifth wheel hoist assembly for a yard tractor, of simple but rugged design and construction; and which has a control circuit that enables the assembly to be incrementally elevated through manipulation of a single control lever, which thereafter maintains itself at such elevation, and which can be incrementally lowered through manipulation of a single control therefor. An additional object is to provide a fifth wheel hoist assembly comprising a plurality of links and levers arranged and interconnected so as to provide an advantageous mechanical advantage between the hydraulic hoist cylinder and the top plate (or trailer supported thereon), thereby reducing the power requirements and consequently size of the hydraulic system. Additional objects and advantages of the invention will become apparent as the specification develops.

An embodiment of the invention is illustrated in the accompanying drawings, in which Figure 1 is a broken perspective view of the rear end portion of a tractor having a fifth wheel assembly embodying the invention; Figure 2 is a top plan view of the fifth wheel assembly shown in Figure 1, but with the top plate thereof illustratde by broken lines; Figure 3 is a side view in elevation of the assembly shown in lowered position; and Figure 4 is a side view in elevation similar to that of Figure 3, but showing elevation of the assembly.

Figure 1 illustrates the rear portion of a tractor chassis 10 supported by an axle assembly 11 through the intermediary agency of leaf springs 12 and 13. The usual axle is provided by the assembly 11, and is provided at the ends thereof with tire-equipped wheels 14. The drive shaft 15 powers the axle assembly and the wheels thereof. For the most part, the structure described may be conventional and, as is well known, the chasis 10 at the forward end thereof will be equipped with an operator's cab, an engine and a front wheel assembly, none of which are shown.

Rigidly secured to the chassis 10 is a hoist frame 16 comprising longitudinally extending rails 17 and 18 and a transversely extending rail 19. All of the rail members are rigidly united, as by means of weld joints at the mating corners thereof; and similarly, the longitudinal rails may be welded to the chassis 10 to effectuate the rigid interconnection thereof. Mounted within the frame 16 is a fifth wheel hoist assembly, designated in general with the numeral 20 and comprising a power cylinder 21 interconnected by a linkage arrangement with a fifth wheel top plate 22.

The casing of the power cylinder 21 is pivotally mounted on a pin 23 carried by a bracket 24 rigidly affixed to the transverse rail 19 of the frame 16. As shown in Figures 3 and 4, the power cylinder is equipped with a piston 25 having a rod 26, provided at its outer end with a collar 27 pivotally receiving a pin 28 extending between and secured at its ends to parallel links 29 and 30 rigidly mounted on a shaft 31. The shaft 31 is hollow or tubular, and is rotatably carried by an axle 32 mounted at the respective ends thereof in the rails 17 and 18 of the hoist frame. The links 29 and 30 (which may be designated hereinafter as cylinder links) extend radially outwardly from the tubular shaft 31, and more particularly from the rotational axis thereof.

Also extending radially outwardly from the shaft 31 adjacent opposite ends thereof are paired links 33—34 and 35—36. The links comprising each pair are oriented in spaced, parallel relation, and extend generally along the path of the cylinder links 29 and 30. Respectively mounted between the spaced links of the two pairs thereof upon pins 37 and 38, are the collars 39 and 40 of drive levers 41 and 42. The drive levers are provided at the opposite ends thereof with the respective collars 43 and 44 pivotally carried by a shaft 45 rotatably carried by depending webs 46, 47, 48 and 49 comprising a portion of the top plate 22.

Also pivotally mounted on the shaft 45 intermediate the respective webs 46—47 and 48—49 are collars 50 and 51 carried at the ends of guide shafts 52 and 53 rigidly affixed at the opposite ends thereof to a tubular shaft 54 rotatably carried by an axle 55 affixed at the ends thereof in the rails 17 and 18. As is most evident from Figure 2, the guide shafts 52 and 53 converge inwardly in the direction of the shaft 45, and preferably are reinforced intermediate the ends thereof with a brace 56.

The top plate 22 is shiftable from a retracted position shown in Figure 3, to an elevated position as shown in Figures 1 and 4, through actuation of the power cylinder 21. This cylinder is energized by hydraulic fluid drawn from the reservoir end 58 of the cylinder 21 and driven by a pump 57 to the working end of the cylinder 59. The pump 57 is coupled to a power take-off shaft 60 with which the tractor is equipped, and power is supplied to the take-off shaft by selectively coupling the same to the engine of the tractor through the transmission thereof, in a manner well known in the art. The inlet 61 and outlet 62 of the pump 57 are connected to the cylinder 21 through conduits 63 and 64, respectively, through a control valve 65 interposed therein when the valve is located in the flow control position shown in full lines in Figure 4. The valve 65 is movable to its alternate position shown in dotted lines through handle 66 manually or mechanically by solenoid or air pressure. In its alternate position the two ends of the cylinder are connected to each to allow and control the piston to retract at a desired speed and the outlet of the pump is connected to the inlet thereof to prevent damage thereto if the valve is operaed without the pump being turned off. Additionally a back flow check valve 67 is provided is the outlet of the pump to entrap liquid in the working end 59 of the cylinder to lock the piston in any position whenever the valve is in its lift position. It should be noted that if a solenoid is used it preferably includes alternately actuated coils for alternate positions and will be connected to appropriate electric circuits (not shown) having swiches therefor in the operator's cab; and when the switch moves the valve to lift position, the pump 57 will supply fluid under pressure to the cylinder 21, causing the piston 25 thereof to move toward the right as viewed in Figure 4, with the result that the top plate 22 of the fifth wheel assembly will be elevated.

In this connection it is to be noted that inlet conduit 63 opens into the reservoir end of the cylinder at ports 63a and 63b axially spaced a distance spanning the thickness of the piston head 25 so that when the piston almost straightens the toggle-like elements 33 and 41, the piston 25 clears port 63a to prevent further lifting if pump still runs and when the pump is shut off the piston drops back until check valve 67 takes over. If desired, a back flow check valve can be provided in the conduit 64 with its opening controlled to lower the fifth wheel but it has been found with the construction of the valve 65 has shown, the speed of lowering is adequately controlled thereby.

To initiate operation of the system, the pump 57 will first have power supplied thereto through the take-off shaft 58. If the valve 65 is in its lowering position, fluid will be shunted from the outlet side of the pump to the inlet side thereof through the by-pass section of the valve 60. When the valve 65 is moved to lift position, pressure fluid will be supplied to the working end 59 of the cylinder 21 through the conduit 64 to move the piston 25 and thus shift the rod 26 into its extended position, whereby the fifth wheel top plate 22 will be elevated. It will be apparent that the top plate may be positioned at selected elevations simply by shutting the pump 57 until check valve 67 takes over. The top plate is retracted by moving the valve 57 to lowering position, whereupon the weight of the top plate and any load carried thereby will force the piston 25 toward the left, as viewed in Figures 3 and 4, and return the hydraulic fluid to the reservoir end 58 of the cylinder 21 through the conduit 63. The top plate may be selectively lowered to various positions by manipulation of handle 66 of the valve and then moving it to lift position with the pump off.

When the piston rod 26 is moved from the retracted position thereof which is shown in Figure 3 to its extended position illustrated in Figure 4, the torque applied thereby to the links 29 and 30 causes the tubular shaft 31 to rotate, whereupon the paired links 33—34 and 35—36 rotate therewith to force the drive levers 41 and 42 upwardly. As a result, the top plate 22 must also ascend because movement thereof in other directions is constrained by the guide levers 52 and 53. When the pressure fluid is released from the cylinder 21, the opposite movements take place—namely, rotation of the various links and the shaft 31 in a counter-clockwise direction (as seen in Figures 3 and 4), whereupon the drive levers 41 and 42 are drawn downwardly, as is the top plate which is pivotally connected thereto.

A mechanical advantage is provided between the cylinder 21 and top plate 22 because of the link and lever arrangement described. Such advantage particularly results because of the relative lengths of the cylinder links 29 and 30 and paired links 33 through 36. All of these links extend radially from the pivotal axis of the shaft 31, and the piston rod 26 in moving to its extended position, applies a rotational force to the shaft through a lever arm approximately equal to the length of the links 29 and 30. The torque thus applied to the shaft is transferred to the drive levers 41 and 42 through a lever arm approximately equal to the length of the links 33 through 36. Since such links are substantially longer than the links 29 and 30, the effective lever arm thereof is much greater than that of the cylinder links and, as a consequence, a greater force is applied to the drive levers than is present at the piston rod 26.

It has been noted that the top plate 22 is pivotally carried upon shaft 45 so that the bifurcated trailing or rear end defined by the legs 68 and 69 may be angled downwardly and rearwardly so as to slide beneath the forward end of a trailer. The generally V-shaped channel 70 formed between the legs is adapted to pass the kingpin of a trailer therethrough and to guide the same into the slot 71. Thus, a tractor equipped with a fifth wheel hoist assembly 20 may be coupled to a trailer in a conventional manner, as by backing the tractor into position beneath the forward end of the trailer, whereby the top plate 22 cams that end of the trailer upwardly and into supported position thereof. Thereafter, the fifth wheel assembly may be elevated in the manner hereinbefore described, to raise the auxiliary wheels of such trailer above the ground, whereupon it may be spot-located. After such placement, the handle 66 is operated to move the valve to lowering position so that the hoist assembly retracts, and the tractor may then be uncoupled from the trailer.

While in the foregoing specification an embodiment of the invention has been set forth in considerable detail for purposes of making an adequate disclosure thereof, it will be apparent to those skilled in the art that numerous changes may be made in those details without departing from the spirit and principles of the invention.

I claim:

1. In a tractor having a chassis and a power take-off a fifth wheel hoist assembly on said chassis comprising a hoist frame on said chassis having a transverse member adjacent its front end, a plate located rearwardly from the transverse member to receive the kingpin assembly of a trailer in supported relation, a guide strut pivoted at its forward end to said plate at a predetermined level under resting conditions and at its rear end to said chassis on a pin disposed below said predetermined level to impose upon said plate a rearward component of movement when raised above said predetermined level, a forwardly breaking toggle assembly having the end of one thereof pivoted to the plate and the end of the other arm pivoted to the frame on an axis disposed below the front end of the guide strut, and means for opening said toggle to raise plate including a piston and cylinder assembly driven by said power take-off and in which one of the elements thereof is pivotally supported upon said transverse member and the other element thereof is connected to said other arm to rotate it about said axis, the combined lengths of said strut and said one arm being greater than the sum of the length of said other arm and the distance between said pin and said axis.

2. In a tractor having a frame and a power take-off, a fifth wheel hoist assembly comprising a side frame member, a transversely extending member on the side frame adjacent one end thereof, a plate spaced from the transverse member to receive the kingpin assembly of a trailer in supported relation, a guide strut pivoted at one end to said plate at a predetermined level under resting conditions and at its other end to said frame member at a point below said predetermined level to impose upon said plate a longitudinal component of movement when raised above said predetermined level, a forwardly breaking toggle assembly having the outer end of one arm pivoted to the plate and the outer end of the other arm to the frame on an axis below said one end of the guide strut, and means for opening said toggle including a piston and cylinder assembly in which one of the elements thereof is pivotally supported upon said transverse member and the other element thereof is connected to said other arm to rotate it about said axis, the combined lengths of said strut and said one arm being greater than the sum of the length of said other arm and the distance between the first said point and said axis, a hydraulic pump driven by said power take-off, means for conductnig the fluid out put of said pump to one end of the cylinder, and means for returning fluid from said cylinder at a point spaced from the opposite end of the cylinder which is passed by the piston in its travel.

3. In combination with a yard tractor or the like having a chassis and a power take-off, a fifth wheel hoist assembly comprising a first shaft supported by said chassis for rotational movement and equipped adjacent the ends thereof with links rigidly secured thereto, a second pair of links rigidly secured to said shaft intermediate said first mentioned links and disposed in substantially the same plane, a plate equipped with a second shaft extending thereacross, a pair of lift rods pivotally secured respectively at one end thereof to said first mentioned links and at the other end thereof to said second shaft, a pair of guide struts pivotally secured at one end to said second shaft and at their other ends pivotally supported with respect to said chassis at a point spaced laterally from and below the level of said first shaft, a power cylinder pivotally carried by said chassis and having a piston equipped with a rod pivotally secured to said second mentioned links, pump means releasably driven from said power take-off for supplying fluid under pressure to said cylinder fluid flow control means including a conduit interconnecting said pump and cylinder having a back flow check valve for establishing and maintaining the elevation of said plate, and manually controlled conduit means for by-passing said check valve for lowering said plate.

4. In a fifth wheel hoist assembly adapted for use with a yard tractor or the like having a power take-off, a frame, a first shaft journalled on said frame and equipped adjacent its ends with links rigidly secured thereto and extending radially outwardly therefrom in a horizontal direction in their resting position, a second pair of links rigidly secured to said shaft intermediate said first mentioned links and extending radially outwardly from the shaft at an angle inclined to the horizontal, a plate equipped with a second shaft extending thereacross, a pair of push rods pivotally secured respectively at an end thereof to said first mentioned links and at the other end thereof to said second shaft, a pair of guide struts pivotally secured at one end to said second shaft and at the other end thereof being pivotally supported by said frame at a level below said second shaft, a power cylinder pivotally supported adjacent an end thereof on said frame and having a piston equipped with a rod pivotally secured to said second mentioned links, and a hydraulic circuit connected with said power cylinder and including a pump adapted to be coupled to such power take-off.

5. In a fifth wheel assembly of the character described, a frame adapted to be secured to the chassis of a yard tractor, a power cylinder having a casing pivotally mounted at an end thereof on said frame and having a rod-equipped piston reciprocable with respect thereto, a fifth wheel plate adapted to receive and support the forward end portion of a trailer thereon and having a shaft, a guide strut pivotally connected to said shaft at one end and to said frame at the other end to define an arcuate path of movement with a lateral component for said plate, a drive lever pivotally secured at one end thereof to said shaft, a link pivotally connected with said drive lever at the other end thereof, a shaft extending transversely of said frame and journalled thereon, said link being rigidly secured to said last mentioned shaft and extending radially outwardly therefrom in a horizontal direction, a crank arm rigidly secured to said last mentioned shaft and extending radially outwardly at an angle inclined to the horizontal and pivotally connected to said piston rod, and means for reciprocating said piston to elevate and retract said plate, said means including a hydraulic system with a conduit having at least one orifice opening into said cylinder at a point in the cylinder past which the piston moves in its excursion whereby said piston is relieved of excursion appreciably beyond this point by the escape of hydraulic fluid through said tube and orifice.

6. In combination with a yard tractor or the like having a chassis, a fifth wheel hoist assembly comprising a first shaft supported by said chassis for rotational movement and equipped adjacent the ends thereof with links rigidly secured thereto, a second pair of links rigidly secured to said shaft intermediate said first mentioned links, a fifth wheel plate equipped with a second shaft extending thereacross, a pair of drive levers pivotally secured respectively at one end thereof to said first mentioned links and at the other end thereof to said second shaft, a pair of guide struts pivotally secured at one end thereof to said second shaft and at the other ends thereof being pivotally supported with respect to said chassis, said guide struts being inclined upwardly in their resting position and converging from said last named supports to said second shaft, a brace connecting said guide struts at opposite points intermediate the ends thereof, a power cylinder pivotally carried by said chassis and having a piston equipped with a rod pivotally secured to said second mentioned links thereby providing a crank drive between said rod and said top plate, pump means for supplying fluid under pressure to said cylinder and being adapted to be connected with said power take-off, a return tube having at least one orifice opening into the cylinder at a point spaced from both ends of the cylinder.

References Cited in the file of this patent

UNITED STATES PATENTS 2,515,575    Van Langen _____ July 18, 1950